(No Model.)

T. J. McGOWAN.
MACHINE FOR HULLING COTTON SEED.

No. 299,931. Patented June 3, 1884.

Attest
Carl Spengel
J. Connelly

Inventor
Theodore J. McGowan
by Jos. S. Tuohig Atty.

UNITED STATES PATENT OFFICE.

THEODORE J. McGOWAN, OF CINCINNATI, OHIO.

MACHINE FOR HULLING COTTON-SEED.

SPECIFICATION forming part of Letters Patent No. 299,931, dated June 3, 1884.

Application filed September 18, 1883. (No model.)

*To all whom it may concern:*

Be it known that I, THEODORE J. MCGOWAN, a citizen of the United States, residing at Cincinnati, Hamilton county, and State of Ohio, have invented a certain new and useful Improvement in Machines for Hulling Cotton-Seed; and I do hereby declare the following to be a full, clear, and accurate description, reference being made to the accompanying drawings, forming part thereof, in which—

Figure 1:
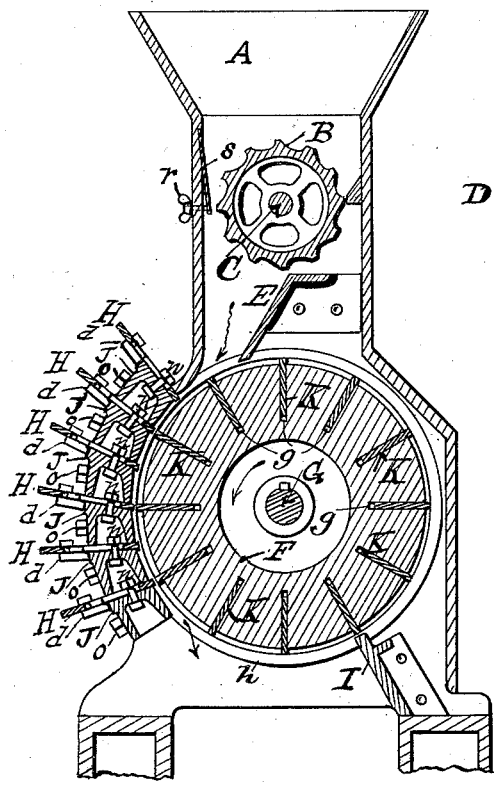
Figure 2:
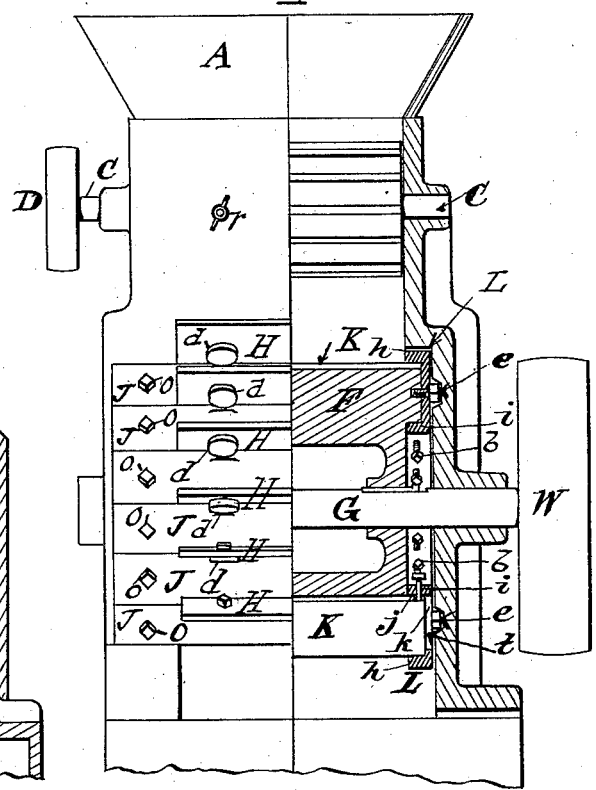
Figure 3:
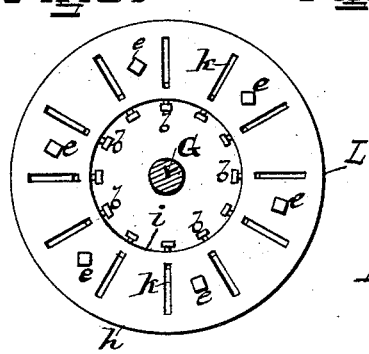
Figure 4:
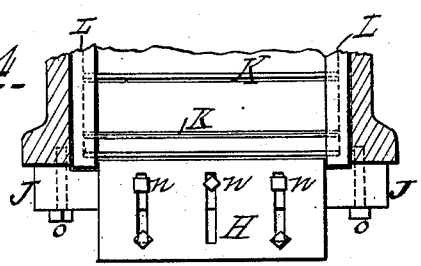
Figure 5:
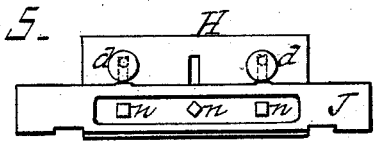

Figure 1 is a vertical side or cross section of the entire machine. Fig. 2 is a front view of the same, partly in section. Fig. 3 is an end view showing the flange attached to the end of the cylinder, for holding its knives in position and counteracting whatever centrifugal force may be imparted to them. Fig. 4 is a top view in detail, showing the relative positions of the concave and cylinder knives and the means for adjusting and holding the former in place. Fig. 5 is an under side view of the same.

The object of my invention is to provide a machine for hulling cotton and analogous seeds which is strong and durable and which will perform its work in a thorough manner.

The difficulty heretofore experienced in machines of this description has been largely due to the centrifugal force communicated to the knives in the cylinder by the revolution thereof, whereby they became loosened and were thrown against the knives of the concave, thus bending or breaking them so as to render them unfit for further use, at the same time injuring the seed. These objections are remedied in my improvements, which will now be fully described.

Referring to the drawings, A is the hopper or reservoir in which the seed is placed; B, the fluted wheel for feeding the seed to the machine; s, a spring readily adjustable by the thumb-screw r, for increasing or decreasing the flow of the seed from the hopper A to the knives. C is the shaft, properly journaled, and D the driving-wheel affixed thereto, for communicating motion to the feed-wheel. E is an oblique cross-piece under the feed-wheel, for guiding the seed in its passage to the revolving cylinder F. Motive power is imparted to this cylinder by means of the driving-wheel W on the shaft G. This shaft G is keyed to the cylinder F and works in proper bearings in the frame of the machine. The cylinder is provided with longitudinal grooves around its circumference, in which are placed knives K. These knives are fastened in position and made adjustable by means of set-screws $b$, so that their cutting-edges can be below, flush with, or extend beyond the periphery of the cylinder, as may be desired.

To prevent the knives of the cylinder from being thrown outward by centrifugal force, I construct the cylinder and apply the knives as shown in Figs. 1, 2, and 3, in which F indicates the drum or cylinder proper, formed with radial grooves or slots $g$, to receive the knives K, which are simply flat metal plates having square or perpendicular edge faces. The ends of the cylinder are recessed concentrically with shaft G, and are furnished with end plates or heads, L, having two annular flanges, $h$ and $i$, the outer one, $h$, being of an internal diameter somewhat greater than the diameter of the cylinder and turned inward over the end of said cylinder, as shown in Fig. 2. The inner flange, $i$, is of a diameter to closely fit the recessed end of cylinder F, and the recess in said end is of such diameter as to reach and connect with the slots or grooves $g$, made to receive the blades or knives K, so that the bottoms of the slots open into said recesses, as shown at $j$, Fig. 2.

The heads or end plates, L, are rigidly secured to the ends of cylinder F by bolts $e$, or equivalent means, which bolts are relieved of all lateral strain by reason of the inner flange, $i$, of the plate being seated in the end of the cylinder. As shown in Fig. 3, the head or end plate is made with radial slots $k$, registering exactly with the slots or grooves $g$ of the cylinder, and each of a size to permit one knife or blade to be passed through it. The heads or end plates are applied and bolted securely to the cylinder-body, and the blades or knives are then passed through the respective slots $k$ into the slots or groove $g$, in which they are free to move outward a distance limited by the overhanging flange $h$ of the head; and to thus move and hold the knives in such position or adjustment, radial set-screws $b$ are passed through the inner flange, $i$, of the head or plate L directly in line with each blade, and turned to force the blade outward until it is pressed firmly against flange $h$. In thus forcing the knives or blades outward they are moved out of line with slots $k$ at their outer edges, and are prevented by the solid portion of the end plates, L, from moving longitudinally.

When it is desired to remove a knife or blade from the cylinder, its set-screws $b$ are loosened and the blade withdrawn in the same manner as it is inserted. To permit the removal of the blade while the cylinder is in the machine, an opening, $t$, may be made through the frame at any convenient point, through which the knife may be withdrawn or replaced.

Both cylinder ends or plates may be provided with slots or openings $k$, if desired; but it is not necessary, or in fact desirable, that both should be, because if one be formed without such slots, then there will be less difficulty in applying the knives, the closed end forming a stop to prevent the knives from being thrust too far inward from one end, and thereby caused to project from the farther end of the cylinder.

H H are the adjustable knives of the concave, fitted to the machine in front of the cylinder F. These knives, when set, are arranged on and fastened to bars J by bolts and nuts $n$, as seen more clearly in Fig. 1, the bars in turn being rigidly secured to the frame of the machine by bolts and nuts $o$. In securing and setting these knives in the concave, I first secure in place the lowest bar J; then to it is bolted the knife; then on top of this knife is fastened the second lowest bar, then another knife, and so on till the requisite number is secured.

The knives of the cylinder and of the concave each have four cutting-edges, so that when one side becomes dull the knife is detached and replaced again in a reversed position. This can be done very quickly and without losing the time which it would otherwise take to sharpen each knife were it only provided with one cutting-edge, and it also avoids the necessity of keeping on hand duplicate knives for such emergencies, and is therefore a great benefit in an economic point of view.

To more rigidly secure the knives H and prevent in a greater degree the possibility of their becoming unseated or slipping from their positions, so that the cylinder-knives in revolving will strike them, thus bending, breaking, or otherwise injuring both sets of cutters, I provide each knife with two or more bolts on the outside of the machine and in front of each knife-bar. These bolts are inserted through the slots in said knives, and each is provided with a nut, $d$, set eccentrically thereon, as seen more clearly in Figs. 4 and 5. This eccentric nut strikes or impinges against the bar J, and when it is turned by means of a wrench or spanner either to the right or left it moves the knife backward or outward to any desired extent; but unless so turned it holds the knife rigidly and securely in position and prevents the cylinder-knives from coming in contact with it and causing the damage heretofore enumerated; and it will also be observed that, no matter at what rate of speed the cylinder F is run, it is impossible for its knives to work loose or be displaced, the flanges on each end of the cylinder serving to hold them securely.

I is the stop for preventing the seed and hulls from being drawn through the machine more than once.

I am aware that blades or knives of cotton-seed hullers have been secured in place by annular bands shrunk upon their ends, and that such blades have also been made with recessed or grooved ends, and an annular retaining hoop or band inserted in said recesses, and prevented from escaping therefrom by heads or end plates secured to the ends of the hulling-cylinder. Such construction I do not claim, and consider impracticable, for the reason that when such machines are put in operation a considerable amount of heat is produced, which in practice so expands the bands that they quickly become loose and unserviceable, the entire length of the loose band contributing by its expansion to the loosening of the knives or blades. By my plan all trouble from this source is overcome, first, because, the flange being formed upon a solid plate bolted fast to the ends of the cylinder, only the slight expansion or enlargement of the band in a radial direction, and not the entire circumferential expansion, can operate to loosen the blades; second, because the set-screws serve to compensate for any expansion, either by their own elongation under the influence of heat, or by turning, if necessary; and finally, because the radial extension of the knives and set-screws will always equal the radial expansion of the flange, which alone has to be provided against under my construction; hence, while disclaiming the construction above mentioned as being old,

What I claim is—

1. In a hulling-machine, a hulling-cylinder consisting of a longitudinally-grooved body, F, heads L, provided with overhanging annular flanges $h$, and blades K, seated in the grooves of the cylinder and projecting beneath the flanges $h$, as shown and described.

2. In a hulling-machine, a hulling-cylinder consisting of body F, having longitudinal slots $g$ and recessed ends, knives K, seated in said slots, and end plates or heads, L, bolted to the ends of the body F, and provided with flanges $h\ i$, the former overhanging the ends of the knives, and the latter seated in the recessed ends of the body F, as shown.

3. A hulling-cylinder consisting of body F, having longitudinal slots $g$ and recessed ends, knives K, seated in said slots, heads or plates L, secured to the ends of the body F, and provided with annular flanges $h\ i$, the former overhanging the outer edges of the blades, and the latter seated in the recessed ends of the body, and set-screws $b$, passing through flanges $i$ and bearing against the inner edges of the knives, substantially as and for the purpose set forth.

4. A hulling-cylinder consisting of body F, having longitudinal grooves $g$, knives K, seated in said grooves, heads L, secured to the ends of the body F, and provided with the slots or openings $k$ and annular flanges $h$ $i$, projecting inward, respectively, over the outer and inner edges of the knives, and set-screws $b$, passing through the flanges $i$ and bearing against the inner edges of the knives, as and for the purpose explained.

5. In a hulling-machine substantially such as shown and described, a concave composed of bars J, slotted knives H, bolts $n$, passing through the knives and bars, and bolts $d$, seated in the knives, and provided with eccentrics, arranged, as shown, to bear against the bars J, whereby they are adapted to withdraw the blades or limit their inward movement, substantially as set forth.

THEODORE J. McGOWAN.

Witnesses:
W. ELLWOOD WYNNE,
J. CONNELLY.